US011795321B2

(12) United States Patent
Sa et al.

(10) Patent No.: US 11,795,321 B2
(45) Date of Patent: Oct. 24, 2023

(54) METHOD FOR PRODUCING BLOCK COPOLYMER COMPOSITION

(71) Applicant: LG Chem, Ltd., Seoul (KR)

(72) Inventors: Seok Pil Sa, Daejeon (KR); Eun Ji Shin, Daejeon (KR); Yoon Ki Hong, Daejeon (KR); Hyun Mo Lee, Daejeon (KR); Ki Soo Lee, Daejeon (KR); Bun Yeoul Lee, Suwon-si (KR)

(73) Assignee: LG Chem, Ltd.

( * ) Notice: Subject to any disclaimer, the term of this patent is extended or adjusted under 35 U.S.C. 154(b) by 707 days.

(21) Appl. No.: 16/977,180

(22) PCT Filed: Mar. 29, 2019

(86) PCT No.: PCT/KR2019/003754
§ 371 (c)(1),
(2) Date: Sep. 1, 2020

(87) PCT Pub. No.: WO2019/190292
PCT Pub. Date: Oct. 3, 2019

(65) Prior Publication Data
US 2021/0002303 A1   Jan. 7, 2021

(30) Foreign Application Priority Data

Mar. 30, 2018   (KR) .......................... 10-2018-0037549
Oct. 2, 2018   (KR) .......................... 10-2018-0117840

(51) Int. Cl.
| | |
|---|---|
| C08F 293/00 | (2006.01) |
| C08F 295/00 | (2006.01) |
| C08F 297/00 | (2006.01) |
| C08F 4/46 | (2006.01) |
| C08F 4/642 | (2006.01) |
| C08L 25/08 | (2006.01) |
| C08L 53/00 | (2006.01) |
| C07F 3/06 | (2006.01) |
| C08F 4/44 | (2006.01) |
| C08F 10/14 | (2006.01) |
| C08F 297/02 | (2006.01) |
| C08L 25/06 | (2006.01) |
| C08F 210/14 | (2006.01) |
| C08F 212/08 | (2006.01) |

(52) U.S. Cl.
CPC .............. C08L 53/00 (2013.01); C07F 3/06 (2013.01); C08F 4/44 (2013.01); C08F 10/14 (2013.01); C08F 210/14 (2013.01); C08F 212/08 (2013.01); C08F 293/00 (2013.01); C08F 295/00 (2013.01); C08F 297/02 (2013.01); C08L 25/06 (2013.01); C08L 25/08 (2013.01); C08L 2201/08 (2013.01)

(58) Field of Classification Search
CPC .... C08F 293/00; C08F 295/00; C08F 297/00; C08F 4/46; C08F 4/642; C08L 25/08
See application file for complete search history.

(56) References Cited

U.S. PATENT DOCUMENTS

| | | | |
|---|---|---|---|
| 3,649,579 | A | 3/1972 | Ramsis et al. |
| 5,618,883 | A | 4/1997 | Plamthottam et al. |
| 2005/0222356 | A1 | 10/2005 | Joly et al. |
| 2007/0078222 | A1 | 4/2007 | Chang et al. |
| 2008/0008739 | A1 | 1/2008 | Hossainy et al. |
| 2008/0153970 | A1 | 6/2008 | Salazar |
| 2008/0171828 | A1 | 7/2008 | Bening et al. |
| 2010/0197541 | A1 | 8/2010 | Li Pi Shan et al. |
| 2012/0077400 | A1 | 3/2012 | Flood et al. |
| 2012/0308752 | A1 | 12/2012 | He et al. |
| 2013/0101767 | A1 | 4/2013 | Wei |
| 2015/0030933 | A1 | 1/2015 | Goetzen et al. |

(Continued)

FOREIGN PATENT DOCUMENTS

| | | |
|---|---|---|
| CN | 1553936 A | 12/2004 |
| CN | 101802151 A | 8/2010 |
| CN | 102892828 A | 1/2013 |
| CN | 104115306 A | 10/2014 |
| CN | 107406474 A | 11/2017 |
| EP | 1470190 A2 | 10/2004 |
| EP | 2042531 A1 | 4/2009 |
| EP | 3257880 A1 | 12/2017 |
| EP | 3590983 A1 | 1/2020 |

(Continued)

OTHER PUBLICATIONS

Cao X Et Al: "Polyisobutylene Based Thermoplastic Elastomers: Vi. Pol Y(Alpha-Methylstyrene-Bisobutylene-B-Alpha-Methylstyrene) Triblock Copolymers By Coupling Of Living Poly (Alphamethylstyrene-B-Isobutylene) Diblock Copolymers", Polymer Bulletin, Springer, Heidelberg, De, vol. 45, No. 2, Sep. 1, 2000 (Sep. 1, 2000), pp. 121-128, Xp000977 404.

(Continued)

*Primary Examiner* — Caixia Lu
(74) *Attorney, Agent, or Firm* — Lerner David LLP

(57) ABSTRACT

A method for producing a block copolymer composition including a diblock copolymer and a triblock copolymer each containing a polyolefin-based block and a polystyrene-based block is disclosed herein. In some embodiments, the method includes reacting an organic zinc compound with one or more kinds of olefin-based monomers in the presence of a transition metal catalyst to form an intermediate having an olefin-based polymer block, reacting the intermediate styrene-based monomer in the presence of an alkyllithium compound to form a product having a styrene-based polymer block, and reacting the product with water, oxygen, or an organic acid to form a block copolymer wherein the number of moles of the alkyllithium compound used to form the product is larger than the number of moles of the organic zinc compound used to form the intermediate.

14 Claims, No Drawings

(56) References Cited

U.S. PATENT DOCUMENTS

| | | | |
|---|---|---|---|
| 2016/0101209 A1 | 4/2016 | Dubois | |
| 2018/0022852 A1* | 1/2018 | Lee | C08F 297/02 525/250 |
| 2018/0030195 A1 | 2/2018 | Oshita et al. | |
| 2018/0187040 A1 | 7/2018 | Wan et al. | |
| 2018/0355090 A1 | 12/2018 | Dubois et al. | |
| 2020/0031978 A1 | 1/2020 | Lee et al. | |
| 2021/0002303 A1 | 1/2021 | Sa et al. | |
| 2021/0002473 A1 | 1/2021 | Lee et al. | |
| 2021/0017377 A1 | 1/2021 | Shin et al. | |
| 2021/0108066 A1 | 4/2021 | Hong et al. | |

FOREIGN PATENT DOCUMENTS

| | | | |
|---|---|---|---|
| JP | 2005516099 | A | 6/2005 |
| JP | 2020512470 | A | 4/2020 |
| KR | 20160098968 | A | 8/2016 |
| KR | 101732418 | B1 | 5/2017 |
| KR | 101829382 | B1 | 2/2018 |
| KR | 101848781 | B1 | 4/2018 |
| WO | 2016127353 | A1 | 8/2016 |
| WO | 2018182174 | A1 | 10/2018 |

OTHER PUBLICATIONS

European Search Report for Application No. 19776148.9, dated Nov. 20, 2020, 7 pages.
European Search Report for Application No. 19778223.8, dated Nov. 20, 2020, 7 pages.
European Search Report for Application No. EP 19775609.1, dated Nov. 20, 2020, 7 pages.
European Search Report for Application No. EP 19776273.5, dated Nov. 20, 2020, 7 pages.
Indian Examination Report for Application No. 202017042499 dated Jan. 19, 2022, 2 pages.
Chung et al., "A Novel Consecutive Chain Transfer Reaction to p-Methylstyrene and Hydrogen during Metallocene-Mediated Olefin Polymerization," Journal of the American Chemical Society, May 30, 2001, pp. 4871-4876, vol. 123, No. 21.
Dong et al., "Synthesis of Polyethylene Containing a Thermal p-Methylstyrene Group Metallocene-Mediated Ethylene Polymerization with a Consecutive Chain Transfer Reaction to p-Methylstyrene and Hydrogen," Macromolecules, Feb. 26, 2002, pp. 1622-1631, vol. 35, No. 5.
International Search Report for Application No. PCT/KR2019/003749 dated Jul. 10, 2019, 2 pages.
International Search Report for Application No. PCT/KR2019/003750 dated Jul. 10, 2019, 2 pages.
International Search Report for Application No. PCT/KR2019/003751 dated Jul. 10, 2019, 2 pages.
International Search Report for Application No. PCT/KR2019/003754 dated Jul. 10, 2019, 2 pages.
Kim et al., "Polystyrene Chain Growth from Di-End-Functional Polyolefins for Polystyrene-Polyolefin-Polystyrene Block Copolymers," Polymers, Oct. 2017, pp. 1-14, vol. 9, No. 481.
Kim et al., "Preparation of polystyrene-polyolefin multiblock copolymers by sequential coordination and anionic polymerization," RSC Advances, Jan. 9, 2017, pp. 5948-5956, vol. 7, No. 10.
Ning et al., "Synthesis of Amphiphilic Block-Graft Copolymers [Poly(styrene-b-ethylene-co-butylene-b-styrene)-g-Poly(acrylic acid)] and Their Aggregation in Water," Journal of Polymer Science Part A: Polymer Chemistry. May 1, 2002, pp. 1253-1266, vol. 40, No. 9.
Peinado, et al., "Effects of ozone in surface modification and thermal stabiity of SEBS block copolymers," Polymer Degradation and Stability, Jun. 1, 2010, pp. 975-986, vol. 95, No. 6.
Rabagliati, et al., "Styrene/(Styrene Derivative) and Styrene/(1-Alkene) Copolymerization Using Ph2Zn-Additive Initiator Systems," Macromol. Symp., Sep. 2004, pp. 55-64, vol. 216, No. 1.
Weiser et al., "Formation of Polyolefin-block-polystyrene Block Copolymers on Phenoxyimine Catalystsa," Molecular Rapid Communications, Jul. 5, 2006, pp. 1009-1014, vol. 27, No. 13.
Scheirs et al. Modern Styrenic Polymers (Year: 2003).
Wypych Handbook of Polymers (Year: 2012).

* cited by examiner

METHOD FOR PRODUCING BLOCK COPOLYMER COMPOSITION

CROSS-REFERENCE TO RELATED APPLICATIONS

The present application is a national phase entry under 35 U.S.C. § 371 of International Application No. PCT/KR2019/003754, filed on Mar. 29, 2019, which claims priority from Korean Patent Application Nos. 10-2018-0037549, filed on Mar. 30, 2018, and 10-2018-0117840, filed on Oct. 2, 2018, the disclosures of which are incorporated by reference herein.

TECHNICAL FIELD

The present invention relates to a method for producing a block copolymer composition, and more specifically, to a method for producing a block copolymer composition including a diblock copolymer and a triblock copolymer each including a polyolefin-based block and a polystyrene-based block.

BACKGROUND ART

Polyolefin-polystyrene block copolymers, for example, styrene-ethylene/butylene-styrene (SEBS) or styrene-ethylene/propylene-styrene (SEPS), are currently forming a market of hundreds of thousands of tons worldwide. In addition, such polyolefin-polystyrene block copolymers have the advantage of having excellent heat resistance and light resistance compared to styrene-butadiene-styrene (SBS) or styrene-isoprene-styrene (SIS), and are used for materials for soft and strong grip and touch of handles, elastic materials for diapers, oil-gels used in medical and communication materials, impact modifiers for engineering plastics, flexibilizers or tougheners for transparent polypropylene. SEBS is typically prepared by a two-step reaction, which includes performing anionic polymerization on styrene and butadien to obtain SBS and hydrogenating the obtained SBS. SEPS is also typically prepared by a two-step reaction, which includes performing anionic polymerization on styrene and isoprene to obtain SIS and hydrogenating the obtained SIS. Such processes of saturating all the double bonds contained in a polymer main chain by a hydrogenation reaction as described above have high processing costs, so that the unit cost of SEBS and SEPS are significantly higher than that of SBS and SIS before the hydrogenation reaction. The above fact may limit market expansion. In addition, since it is practically impossible to saturate all the double bonds in a polymer chain through a hydrogenation reaction, commercialized SEBS and SEPS inevitably contain some remaining double bonds, the presence of which often cause problems (Journal of Polymer Science: Part A: Polymer Chemistry, 2002, 40, 1253; Polymer Degradation and Stability 2010, 95, 975). Furthermore, a typical block copolymer produced through two steps as described above is very limited in structure since a polyolefin block is formed through a hydrogenation reaction after the anionic polymerization of butadien or isoprene.

Given the above background, producing a polyolefin-polystyrene block copolymer directly from an olefin monomer and a styrene monomer by a one-pot reaction is a highly-challenging research subject which may have significant commercial ramifications. Related to the above, it has been reported as an example of producing a polypropylene-polystyrene block copolymer in that para-methyl styrene is used as a molecular weight control agent when polymerizing propylene to synthesize polypropylene having a para-methyl styryl group in the terminal thereof, and then a dehydrogenation reaction of a methyl group of the terminal is induced with butyllithium followed by performing styrene anionic polymerization (J. Am. Chem. Soc. 2001, 123, 4871; Macromolecules 2002, 35, 1622). As another example thereof, attempts of producing a block copolymer have been reported in that ethylene/propylene copolymerization is performed utilizing the living polymerization reactivity of phenoxy-imine which is a catalyst, followed by successive injections of styrene monomers (Marcomole. Rapid. Commun., 2006, 27, 1009). However, the reported typical methods described above all have a problem in that a multi-step process is required, and thus, have not been applied to a commercial process.

DISCLOSURE OF THE INVENTION

Technical Problem

An aspect of the present invention provides a method for producing a block copolymer composition which is excellent in physical properties and includes a diblock copolymer and a triblock copolymer each including a polyolefin-based block and a polystyrene-based block.

Technical Solution

According to an aspect of the present invention, there is provided a method for producing a block copolymer composition, the method including (1) a step of reacting an organic zinc compound with one or more kinds of olefin-based monomers in the presence of a transition metal catalyst to form an intermediate including an olefin-based polymer block, and (2) a step of reacting the intermediate obtained in Step (1) with a styrene-based monomer in the presence of an alkyllithium compound to form a product including a styrene-based polymer block. The number of moles of the alkyllithium compound used in Step (2) is larger than the number of moles of the organic zinc compound used in Step (1), and the block copolymer composition includes a diblock copolymer and a triblock copolymer each including a polyolefin-based block and a polystyrene-based block, wherein the content of the diblock copolymer is 19 wt % or less.

Advantageous Effects

A method for producing a block copolymer composition according to the present invention is environmentally friendly and safe, and is a method capable of controlling the length and content of a branch structure of a repeating unit included in a polyolefin-based block. The method may provide a block copolymer composition excellent in thermal stability and chemical durability, and by maximizing the content of a triblock in a block copolymer composition to be produced, the method may improve the physical properties of the block copolymer composition.

BEST MODE FOR CARRYING OUT THE INVENTION

Hereinafter, the present invention will be described in more detail to facilitate understanding of the present invention.

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

The term 'composition' used in the present specification includes not only a reaction product and a decomposition product formed from materials of a corresponding composition, but also a mixture of materials including the corresponding composition.

The term 'residual unsaturated bond' used in the present specification means an unsaturated bond such as double bond and a triple bond present in a polymer chain of a block copolymer contained in a block copolymer composition. The polymer chain includes a main chain and a branched chain of a block copolymer, and includes not only an unsaturated bond either contained in a raw material for producing the block copolymer, such as a monomer, a multimer, an initiator, and a catalyst, or derived therefrom, but also an unsaturated bond generated in a polymerization process.

The term 'halogen' used in the present specification means fluorine, chlorine, bromine, or iodine unless otherwise stated.

The term 'alkyl' used in the present specification means a linear, cyclic or branched hydrocarbon moiety unless otherwise stated.

The term 'aryl' used in the present specification refers to an aromatic group including phenyl, naphthyl anthryl, phenanthrenyl, chrycenyl, pyenyl, and the like, unless otherwise stated.

In the present specification, 'silyl' may be silyl substituted or unsubstituted with alkyl having 1 to 20 carbon atoms, for example, trimethylsilyl, or triethylsilyl.

The method for producing a block copolymer composition of the present invention is a method for producing a block copolymer composition containing a polyolefin-based block and a polystyrene-based block, the method including (1) a step of reacting an organic zinc compound with one or more kinds of olefin-based monomers in the presence of a transition metal catalyst to form an intermediate having an olefin-based polymer block, and (2) a step of reacting the intermediate obtained in Step (1) with a styrene-based monomer in the presence of an alkyllithium compound to form a product having a styrene-based polymer block.

A block copolymer composition produced by the method for producing a block copolymer composition of the present invention includes a diblock copolymer containing a polyolefin-based block and a polystyrene-based block and a triblock copolymer containing a polyolefin-based block and a polystyrene-based block, wherein the content of the diblock copolymer is 19 wt % or less. In order to achieve the above, the method for producing a block copolymer composition of the present invention is characterized in that the number of moles of the alkyllithium compound used in Step (2) is larger than the number of moles of the organic zinc compound used in Step (1).

The method for producing a block copolymer composition of the present invention is capable of minimizing the content of diblock copolymer and increasing the content of triblock copolymer in the block copolymer composition, and thus, may provide a block copolymer composition having excellent thermal stability, chemical durability, and mechanical properties of a block copolymer.

Hereinafter, each step of the method for producing a block copolymer composition of the present invention will be described.

(1) Step of reacting organic zinc compound with one or more kinds of olefin-based monomers in the presence of transition metal catalyst to form an intermediate having an olefin-based polymer block In Step (1), the olefin-based monomer may be inserted between Zn and A of the organic zinc compound and polymerized to form an olefin-based polymer block.

In an exemplary embodiment of the present invention, the olefin-based polymer block formed by the polymerization of one or more kinds of the olefin-based monomers may include a repeating unit represented by Formula 1 below, and in the present specification, the olefin-based polymer block including a repeating unit represented by Formula 1 below is denoted as a first block.

In Step (1), the olefin-based monomer may form the first block including one or more kinds of repeating units represented by Formula 1 below.

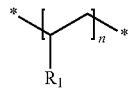

[Formula 1]

In Formula 1, $R_1$ is hydrogen, alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl, and n may be an integer of 1 to 10,000.

Alternatively, in an exemplary embodiment of the present invention, $R_1$ may be hydrogen, or alkyl having 3 to 20 carbon atoms.

Alternatively, in an exemplary embodiment of the present invention, $R_1$ may be hydrogen, or alkyl having 3 to 12 carbon atoms. Specifically, $R_1$ may be hydrogen, or alkyl having 4 to 12 carbon atoms.

Alternatively, n may be an integer of 10 to 10,000. Specifically, n may be an integer of 500 to 7,000.

Meanwhile, in the formulas shown in the specification of the present invention, "*" is a terminal site of a repeating unit and represents a connection site.

In an exemplary embodiment of the present invention, when the first block includes two or more kinds of repeating units represented by Formula 1 above, the first block may include a repeating unit represented by Formula 2 below.

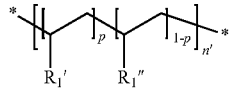

[Formula 2]

In Formula 2, $R_1'$ and $R_1''$ are each independently hydrogen, alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl, wherein $R_1'$ and $R_1''$ are different from each other, 0<p<1, and n' may be an integer of 1 to 10,000.

Alternatively, in an exemplary embodiment of the present invention, $R_1'$ and $R_1''$ may be each independently hydrogen, or alkyl having 3 to 20 carbon atoms, and specifically, may be each independently hydrogen, or alkyl having 3 to 12 carbon atoms, and more specifically, may be each independently hydrogen, or alkyl having 4 to 12 carbon atoms.

Alternatively, n' may specifically be an integer of 10 to 10,000, and more specifically, may be an integer of 500 to 7,000.

In an exemplary embodiment of the present invention, in Formula 2, either $R_1'$ or $R_1''$ may be hydrogen, and the other one may be a substituent other than hydrogen among the substituents described above.

That is, in an exemplary embodiment of the present invention, when the first block includes two or more kinds of repeating units represented by Formula 1 above, a structure in which $R_1$ is hydrogen and a structure in which $R_1$ is not hydrogen but alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl may be randomly connected. Specifically, a structure in which $R_1$ is hydrogen and a structure in which $R_1$ is not hydrogen but alkyl having 3 to 20 carbon atoms may be randomly connected.

Alternatively, more specifically, the first block may have a structure in which $R_1$ is hydrogen and a structure in which $R_1$ is alkyl having 3 to 12 carbon atoms randomly connected to each other. Even more specifically, the first block may have a structure in which $R_1$ is hydrogen and a structure in which $R_1$ is alkyl having 4 to 12 carbon atoms randomly connected to each other.

When the first block includes two or more kinds of repeating units represented by Formula 1 above, in Formula 1, the first block may include a structure in which $R_1$ is hydrogen and a structure in which $R_1$ has a substituent other than hydrogen in a weight ratio of 30:90 to 70:10, specifically 40:60 to 60:40, and more specifically 45:75 to 55:25.

When the first block includes a structure in which $R_1$ is hydrogen and a structure in which $R_1$ has a substituent other than hydrogen in the above range, a block copolymer to be produced includes branches to an appropriate degree within a structure. Therefore, the produced block copolymer has a high 300% modulus value and a high elongation at break value to exhibit excellent elasticity properties, and has a high molecular weight and exhibits a wide molecular weight distribution to have excellent processability.

In an exemplary embodiment of the present invention, an olefin-based monomer inserted between Zn and A of the organic zinc compound and polymerized, thereby forming the olefin-based polymer block (first block) may include ethylene and one or more kinds of alpha-olefin-based monomers together, and may specifically include ethylene and one or more kinds of alpha-olefin-based monomers other than ethylene.

In an exemplary embodiment of the present invention, the alpha-olefin-based monomer may specifically be an aliphatic olefin having 3 to 20 carbon atoms, more specifically an aliphatic olefin having 4 to 12 carbon atoms, and even more specifically an aliphatic olefin having 5 to 12 carbon atoms. The aliphatic olefin may be, for example, propylene, 1-butene, 1-pentene, 3-methyl-1-butene, 1-hexene, 4-methyl-1-pentene, 3-methyl-1-pentene, 1-heptene, 1-octene, 1-decene, 1-undecene, 1-dodecene, 1-tetradecene, 1-hexadecene, 1-eicosene, 4,4-dimethyl-1-pentene, 4,4-diethyl-1-hexene or 3,4-dimethyl-1-hexene, and the like, and may be any one thereof or a mixture of two or more thereof.

In an exemplary embodiment of the present invention, the organic zinc compound may be a compound represented by Formula 3 below.

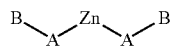

[Formula 3]

In Formula 3, A is alkylene having 1 to 20 carbon atoms, arylene having 6 to 20 carbon atoms, or arylene having 6 to 20 carbon atoms substituted with halogen, alkyl having 1 to 12 carbon atoms, cycloalkyl having 3 to 12 carbon atoms, alkoxy having 1 to 8 carbon atoms or aryl having 6 to 12 carbon atoms, and B is arylene having 6 to 12 carbon atoms substituted with alkenyl having 2 to 12 carbon atoms.

Alternatively, A may be alkylene having 1 to 20 carbon atoms, arylene having 6 to 12 carbon atoms, or arylene having 6 to 20 carbon atoms substituted with halogen, alkyl having 1 to 12 carbon atoms, cycloalkyl having 3 to 12 carbon atoms, alkoxy having 1 to 8 carbon atoms or aryl having 6 to 12 carbon atoms, and B may be arylene having 6 to 12 carbon atoms substituted with alkenyl having 2 to 8 carbon atoms.

Formula 3 may have a structure in which both ends of the formula are double bonds. For example, when B is arylene substituted with alkenyl, the arylene is connected to A and the double bond of the alkenyl substituted in the arylene may be located in the outermost portion of Formula 3.

When the organic zinc compound is reacted with one or more kinds of olefin-based monomers for forming the first block as described above in the presence of a transition metal catalyst for olefin polymerization, the olefin-based monomer is inserted between zinc (Zn) and an organic group (A) of the organic zinc compound and polymerized, so that an intermediate formed with an olefin-based polymer block (first block) may be prepared. An example of the intermediate formed as described above is shown in Formula 4 below.

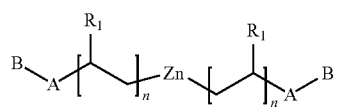

[Formula 4]

In Formula 4, $R_1$ is hydrogen, alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl, A is alkylene having 1 to 20 carbon atoms, arylene having 6 to 20 carbon atoms, or arylene having 6 to 20 carbon atoms substituted with halogen, alkyl having 1 to 12 carbon atoms, cycloalkyl having 3 to 12 carbon atoms, alkoxy having 1 to 8 carbon atoms or aryl having 6 to 12 carbon atoms, B is arylene having 6 to 12 carbon atoms substituted with alkenyl having 2 to 12 carbon atoms, and n is an integer of 1 to 10,000.

Alternatively, $R_1$ and n are respectively the same as defined in Formula 1, and A and B are respectively the same as defined in Formula 3.

In an exemplary embodiment of the present invention, an example of the intermediate formed by reacting the organic zinc compound with two or more kinds of olefin-based monomers for forming the first block as described above in the presence of a transition metal catalyst for olefin polymerization may be represented by Formula 5 below.

[Formula 5]

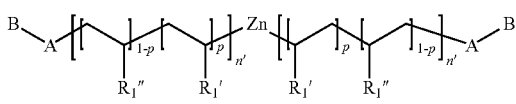

In Formula 5, $R_1'$, $R_1''$, p and n' are respectively the same as defined in Formula 2, and A and B are respectively the same as defined in Formula 3.

(2) Step of Reacting Intermediate Obtained in Step (1) with Styrene-Based Monomer in the Presence of Alkyllithium Compound to Form Styrene-Based Polymer Block In Step (2), the styrene-based monomer may be inserted between Zn of the intermediate and an olefin-based polymer block and polymerized to form a product having a styrene-based polymer block.

The alkyllithium compound may be an alkyllithium compound including silicon atoms, and may be, for example, $Me_3SiCH_2Li$.

In an exemplary embodiment of the present invention, the styrene-based polymer block formed by the polymerization of the styrene-based monomer may include a repeating unit represented by Formula 6 below. In the present specification, the styrene-based polymer block including a repeating unit represented by Formula 6 below is denoted as a second block.

[Formula 6]

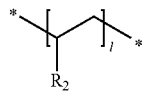

In Formula 6, $R_2$ is aryl having 6 to 20 carbon atoms, or aryl having 6 to 20 carbon atoms substituted with halogen, alkyl having 1 to 12 carbon atoms, cycloalkyl having 3 to 12 carbon atoms, alkoxy having 1 to 8 carbon atoms or aryl having 6 to 12 carbon atoms, and l is independently an integer of 10 to 1,000.

In an exemplary embodiment of the present invention, $R_2$ may be phenyl, or phenyl substituted or unsubstituted with halogen, alkyl having 1 to 8 carbon atoms, cycloalkyl having 3 to 12 carbon atoms, alkoxy having 1 to 8 carbon atoms or aryl having 6 to 12 carbon atoms. Alternatively, $R_2$ may be phenyl.

l is an integer of 10 to 1,000, and may specifically be an integer of 50 to 700. When l is in the above range, the viscosity of a polyolefin-polystyrene block copolymer produced by the production method of the present invention may be at an appropriate level.

In Step (2), since the styrene-based monomer is inserted between Zn of the intermediate and the olefin-based polymer block and polymerized, thereby forming a styrene-based polymer block (second block), a composite block represented by Formula 7 below, the composite block formed by coupling a first block including a repeating unit represented by Formula 1 above and a second block including a repeating unit represented by Formula 6 above, may be formed.

[Formula 7]

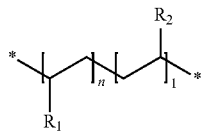

In Formula 7, $R_1$ is hydrogen, alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl, $R_2$ is aryl having 6 to 20 carbon atoms, or aryl having 6 to 20 carbon atoms substituted with halogen, alkyl having 1 to 12 carbon atoms, cycloalkyl having 3 to 12 carbon atoms, alkoxy having 1 to 8 carbon atoms or aryl having 6 to 12 carbon atoms, l is an integer of 10 to 1,000, and n is an integer of 1 to 10,000.

Alternatively, in Formula 7, $R_1$, $R_2$, l and n are respectively the same as defined in Formula 1 and Formula 6, respectively.

Alternatively, when the first block includes a repeating unit represented by Formula 2, a composite block formed by coupling a second block including a repeating unit represented by Formula 6 above may be represented by Formula 8 below.

[Formula 8]

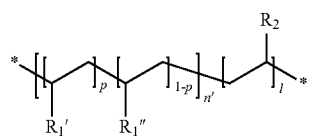

In Formula 8, $R_1'$, $R_1''$, p, l and n' are respectively the same as defined in Formula 2 or Formula 6.

In the production method according to an exemplary embodiment of the present invention, in Step (2), the styrene-based monomer is inserted between Zn of the intermediate and the olefin-based polymer block and polymerized, thereby forming a styrene-based polymer block (second block), and simultaneously, the styrene-based monomer may be coupled to a portion represented by B in the organic zinc compound represented by Formula 4 and polymerized, so that a separate styrene-based polymer block may be formed. In the present specification, the separate styrene-based polymer block formed by coupling the styrene-based monomer to a portion represented by B and polymerizing the same is denoted as a third block.

In the production method according to an exemplary embodiment of the present invention, in Step (2), since the second block and the third block are simultaneously formed, a triblock copolymer may be formed.

The third block may include a repeating unit represented by Formula 9 below.

[Formula 9]

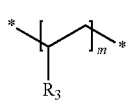

In Formula 9, $R_3$ is aryl having 6 to 20 carbon atoms, or aryl having 6 to 20 carbon atoms substituted with halogen, alkyl having 1 to 12 carbon atoms, cycloalkyl having 3 to 12 carbon atoms, alkoxy having 1 to 8 carbon atoms or aryl having 6 to 12 carbon atoms, and m is independently an integer of 10 to 1,000.

Alternatively, in an exemplary embodiment of the present invention, $R_3$ may be phenyl, or phenyl substituted or unsubstituted with halogen, alkyl having 1 to 8 carbon atoms, cycloalkyl having 3 to 12 carbon atoms, alkoxy having 1 to 8 carbon atoms or aryl having 6 to 12 carbon atoms. Alternatively, $R_3$ may be phenyl.

m is an integer of 10 to 1,000, and may specifically be an integer of 50 to 700.

That is, in an exemplary embodiment of the present invention, in Step (2), the styrene-based monomer may form the second block including a repeating unit represented by Formula 6 above and the third block including a repeating unit represented by Formula 9 above.

In the production method according to an exemplary embodiment of the present invention, since the first block, the second block, and the third block are formed symmetrically around zinc (Zn) of the organic zinc compound represented by Formula 3, in Step (2), a compound in which a triblock copolymer including three blocks is symmetrically formed around zinc may be formed. An example of the block copolymer formed as described above is shown in Formula 10 below.

one third block, it means that the block copolymer includes two composite blocks and one third block.

In addition, in an exemplary embodiment of the present invention, when the block copolymer includes two or more composite blocks of Formula 7, composite blocks except for one composite block are connected to the other composite blocks, and may not be connected to a third block. For example, when the block copolymer includes two or more of the composite blocks, the third block is connected with one composite block and the one composite block is extended through the coupling between composite blocks, so that the block copolymer may have a structure of "the third block-composite block-composite block— . . . ."

Alternatively, when two composite blocks are connected, a first block and a second block included in the composite blocks may be connected. For example, when a block copolymer according to an exemplary embodiment of the present invention includes one third block and two composite blocks, the block copolymer may have a structure of "the third block-first block-second block-first block-second block— . . . ."

As described above, a block copolymer composition according to an exemplary embodiment of the present invention may include a block copolymer including a structure represented by Formula 12 below.

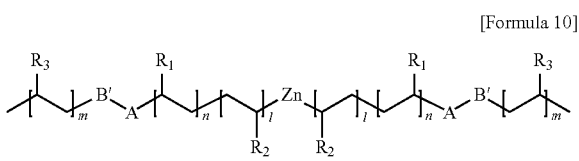

[Formula 10]

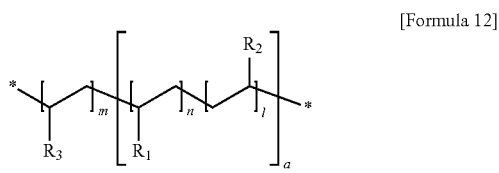

[Formula 12]

In Formula 10, $R_1$ to $R_3$, l, m and n are respectively the same as defined in Formulas 1, 5, and 7. A is the same as defined in Formula 3, and B' represents a form in which B defined in Formula 3 is coupled with a repeating unit of Formula 9 above.

Alternatively, when the first block includes a repeating unit represented by Formula 2 above, an example of the compound in which a triblock copolymer including three blocks is symmetrically formed around zinc, the compound prepared in Step (2), may be represented by Formula 11 below.

In Formula 12, $R_1$ is hydrogen, alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl, $R_2$ and $R_3$ are each independently aryl having 6 to 20 carbon atoms, or aryl having 6 to 20 carbon atoms substituted with halogen, alkyl having 1 to 12 carbon atoms, cycloalkyl having 3 to 12 carbon atoms, alkoxy having 1 to 8 carbon atoms or aryl having 6 to 12 carbon atoms, l and m are each independently an integer of 10 to 1,000, and n is an integer of 1 to 10,000.

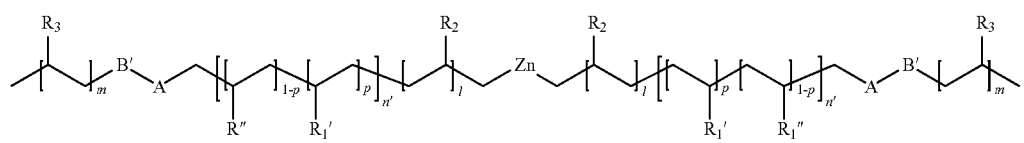

[Formula 11]

In Formula 11, $R_1'$, $R_1''$, $R_2$, $R_3$, p, l, m and n' are respectively the same as defined in Formulas 2, 5, and 7. A is the same as defined in Formula 3, and B' represents a form in which B defined in Formula 3 is coupled with a repeating unit of Formula 9 above.

In an exemplary embodiment of the present invention, when two or more first and second blocks are included, the first block and the second block may be included by having a composite block of a structure represented by Formula 7 or Formula 8 as a repeating unit. For example, when a block copolymer includes two first blocks, two second blocks, and Also, in Formula 12, a may be an integer of 1 to 50, specifically an integer of 1 to 20, and more specifically an integer of 1 to 10.

Alternatively, in Formula 12, $R_1$ to $R_3$, l, m and n are respectively the same as defined in Formulas 1, 6, and 9.

Alternatively, a block copolymer composition according to an exemplary embodiment of the present invention may include a block copolymer including a structure represented by Formula 13 below.

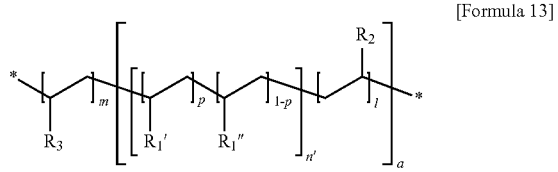

[Formula 13]

In Formula 13, $R_1'$ and $R_1''$ are each independently hydrogen, alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl, wherein $R_1'$ and $R_1''$ are different from each other, $0<p<1$, $R_2$ and $R_3$ are each independently aryl having 6 to 20 carbon atoms, or aryl having 6 to 20 carbon atoms substituted with halogen, alkyl having 1 to 12 carbon atoms, cycloalkyl having 3 to 12 carbon atoms, alkoxy having 1 to 8 carbon atoms or aryl having 6 to 12 carbon atoms, l and m are each independently an integer of 10 to 1,000, and n is an integer of 1 to 10,000.

Also, in Formula 13, a may be an integer of 1 to 50, specifically an integer of 1 to 20, and more specifically an integer of 1 to 10.

Alternatively, in Formula 13, $R_1'$, $R_1''$, $R_2$, $R_3$, p, l, m and n' are respectively the same as defined in Formulas 2, 6, and 9.

In an exemplary embodiment of the present invention, the styrene-based monomer may be, for example, a styrene-based monomer substituted with halogen, alkyl having 1 to 8 carbon atoms, cycloalkyl having 3 to 12 carbon atoms, alkoxy having 1 to 8 carbon atoms or aryl having 6 to 12 carbon atoms.

As described above, since the second block and the third block are simultaneously formed in Step (2), a triblock copolymer may be formed. When either the second block or the third block is not formed in Step (2), a diblock copolymer is formed.

The block copolymer composition of the present invention includes a polystyrene-polyolefin-polystyrene triblock copolymer and a polyolefin-polystyrene diblock copolymer, wherein the content of the diblock copolymer is 19 wt % or less. The content of the polyolefin-polystyrene diblock copolymer and the polystyrene-polyolefin-polystyrene triblock copolymer is influenced by the ratio of the number of moles of the organic zinc compound used in Step (1) and the number of moles of the alkyllithium compound used in Step (2).

In the method for producing a block copolymer composition of the present invention, the number of moles of the alkyllithium compound used in Step (2) is larger than the number of moles of the organic zinc compound used in Step (1) In other words, in the production process of the block copolymer of the present invention, the amount of lithium (Li) used is more than the amount of zinc (Zn) used. When the number of moles of the alkyllithium compound used in Step (2) is larger than the number of moles of the organic zinc compound used in Step (1), the polymerization rate is increased so that productivity is increased, and both the zinc (Zn) and olefin-based polymer ends are initiated so that the triblock copolymer may be effectively synthesized.

Meanwhile, the number of moles of the alkyllithium compound used in Step (2) is not particularly limited, as long as it is larger than the number of moles of the organic zinc compound used in Step (1). However, the ratio of the number of moles of the organic zinc compound used in Step (1) to the number of moles of the alkyllithium compound used in Step (2) may be 1:1.05 to 1:4, specifically 1:1 to 1:3, and more specifically 1:1.1 to 1:2.5.

According to the method for producing a block copolymer composition of the present invention, since the amount of lithium (Li) used is more than the amount of zinc (Zn) used, both the zinc (Zn) and olefin-based polymer ends are initiated to effectively synthesize the triblock copolymer, so that the content of the diblock polymer may be minimized. The block copolymer composition of the present invention may include the diblock copolymer among copolymer compositions in an amount of 19 wt % or less, specifically 18 wt % or less, and more specifically 17 wt % or less. As the content of the diblock copolymer increases, the mechanical properties of the copolymer composition may decrease.

Therefore, the smaller the content of the diblock copolymer, the better. However, the lowest limit of the diblock copolymer content may be 0.1 wt %. In an exemplary embodiment of the present invention, the diblock copolymer may include the structure of Formula 7 or Formula 8, and the triblock copolymer may include the structure of Formula 12 or Formula 13. Alternatively, the diblock copolymer may have a CH3 type structure in which one end of Formula 7 or Formula 8 is coupled with a unit derived from the organic zinc compound of Formula 3, that is, B and A defined in Formula 3, and the other end thereof is terminated, and the triblock copolymer may have the structure of Formula 14 or Formula 15.

In an exemplary embodiment of the present invention, in Step (2), an amine-based compound, specifically, a triamine compound may be used with the alkyllithium compound, and the triamine compound may be, for example, N,N,N'', N'',N''-pentamethyldiethylenetriamine (PMDETA). The alkyllithium compound and the amine-based compound may be used in a molar ratio of, for example, 0.5:1 to 1:1. The amine-based compound may act as an initiator in combination with alkyllithium compound.

The block copolymer composition produced by the production method according to an exemplary embodiment of the present invention may include, based on the total block copolymer composition, the first block in an amount of 10 wt % to 99 wt % and the second block and the third block in an amount of 1 wt % to 90 wt % in total. Alternatively, the block copolymer composition may specifically include the first block in an amount of 40 wt % to 85 wt % and the second block and the third block in an amount of 15 wt % to 60 wt % in total. Even more specifically, the block copolymer composition may include the first block in an amount of 60 wt % to 80 wt % and the second block and the third block in an amount of 20 wt % to 40 wt % in total.

Also, the method for producing a block copolymer composition of the present invention may further include (3) a step of reacting a product produced in Step (2) with water, oxygen, or an organic acid to convert the product into a block copolymer.

The product produced in Step (2) may be represented by Formula 8 as described above. When water, oxygen, or an organic acid is introduced to the compound produced in Step (2) which includes block copolymers symmetrically formed around zinc (Zn), zinc and a block coupled to the zinc are separated so that two block copolymers may be formed.

Accordingly, the block copolymer composition according to an exemplary embodiment of the present invention may include a structure in which a unit derived from a compound used in the production process of the block copolymer composition, the compound being specifically the organic zinc compound of Formula 3, is included between the third block and the first block. An example of the block copolymer structure is shown in Formula 14 below.

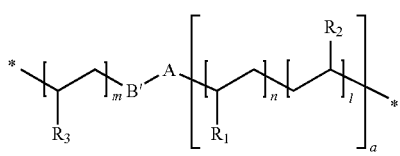

[Formula 14]

In Formula 14, $R_1$ to $R_3$, 1, m and n are respectively the same as defined in Formulas 1, 5, and 7. A is the same as defined in Formula 3, and B' represents a form in which B defined in Formula 3 is coupled with a repeating unit of Formula 9 above.

In addition, another exemplary embodiment of the block copolymer structure in which a unit derived from a compound used in the production process of the block copolymer composition, the compound being specifically the organic zinc compound of Formula 3, is included between the third block and the first block may be represented by Formula 15 below.

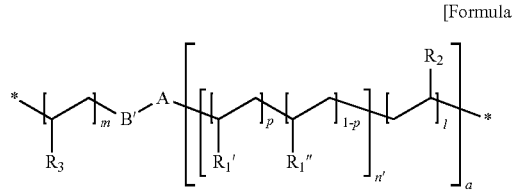

[Formula 15]

In Formula 15, $R_1'$, $R_1''$, $R_2$, $R_3$, p, l, m and n' are respectively the same as defined in Formulas 2, 6, and 9. A is the same as defined in Formula 3, and B' represents a form in which B defined in Formula 3 is coupled with a repeating unit of Formula 9 above.

The method for producing a block copolymer composition according to an exemplary embodiment of the present invention includes a process of preparing, using the organic zinc compound, a compound including block copolymers symmetrically formed around zinc and then introducing water, oxygen, or an organic acid thereto, but does not require a saturation process for separately hydrogenating the block copolymer. Therefore, the method has an advantage of being implemented by a one-pot production method in which a process for separately hydrogenating a block copolymer is omitted.

In addition, the method for producing a block copolymer composition of the present invention does not use a monomer which may leave a residual unsaturated bond like a diene compound such as butadiene or isoprene in a process for preparing a polyolefin-based block, the process which is included in the method. Therefore, the method does not have a problem in which an unsaturated bond not saturated even by a saturation process remains.

The above-described method for producing a block copolymer composition of the present invention uses an organic zinc compound as represented by Formula 3 above in the production of a block copolymer, so that the structure of a polyolefin block produced thereby is not limited, and thus, a polyolefin block having various structures may be produced. Therefore, it is possible to efficiently produce a block copolymer according to the usage and purpose thereof.

The block copolymer composition produced as described above may have a weight average molecular weight of 58,000 g/mol to 500,000 g/mol, specifically 60,000 g/mol to 300,000 g/mol, and more specifically 65,000 g/mol to 105,000 g/mol.

The block copolymer composition may have a polydispersity index (PDI) of greater than 1.1 to 3 or less, specifically 1.2 to 2.5, and more specifically 1.3 to 1.9.

The block copolymer composition may have a tensile strength measured based on ISO37 of 32 MPa or less, specifically 5 MPa to 21 MPa, and more specifically 15 MPa to 26 Mpa.

Also, the block copolymer composition may have a 300% modulus value of 2 MPa to 15 Mpa, specifically 2 MPa to 10 MPa, and more specifically 2.4 MPa to 8 Mpa.

In addition, the block copolymer composition may have an elongation at break value of 800% to 3,000%, specifically 850% to 2,500%, and more specifically 850% to 2,300%.

MODE FOR CARRYING OUT THE INVENTION

Examples

Hereinafter, embodiments of the present invention will be described in detail so that those skilled in the art may easily carry out the present invention. The present invention may, however, be embodied in many different forms and is not limited to the embodiments set forth herein.

Preparation Example: Preparing Organic Zinc Compound

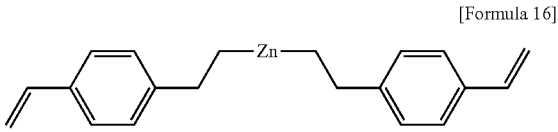

[Formula 16]

Borane dimethyl sulfide (1.6 mL, 3.2 mmol) was slowly introduced to triethyl borane (0.6 g) in stirring and then reacted for 90 minutes. The mixture was slowly introduced to divinylbenzen (3.8 g) dissolved in anhydrous diethyl ether (10 mL) cooled to −20° C. and then stirred overnight. A solvent was removed with a vacuum pump and then diethyl zinc (0.8 g) was added. A reaction was performed at 0° C. for 5 hours while removing triethyl borane generated through reduced pressure distillation. At 40° C., excess divinylbenzene and diethylzinc were removed by reduced pressure distillation. Methylcyclohexane (150 mL) was added to dissolve a product again, and then a solid compound produced as a by-product was filtered using celite and removed to prepare an organic zinc compound represented by Formula 16 above.

Example 1

15 mL of 1-hexene and 240 μmol of an organic zinc compound {$(CH_2=CHC_6H_4CH_2CH_2)_2Zn$} dissolved in 100 g of methylcyclohexane was introduced into a high-pressure reactor, and then the temperature of the reactor was raised to 80° C.

A solution (5 μmol) containing a transition metal compound represented by Formula 17 below and [$(C_{18}H_{37})N(Me)H^+[B(C_6F_5)_4]^-$ which is a cocatalyst at a ratio of 1:1 was injected into the high-pressure reactor, and then ethylene was immediately injected thereto to maintain the pressure at 20 bar.

A polymerization process was performed at a temperature of 95° C. to 100° C. for 45 minutes, and then unreacted gas was discharged. Me$_3$SiCH$_2$Li and N,N,N",N",N"-pentam- Examples 2 to 9

A polymer composition was produced in the same manner as in Example 1 except that 1-hexene, styrene, an organic zinc compound, methylcyclohexane, a transition metal compound/cocatalyst solution, Me$_3$SiCH$_2$Li and PMDETA were used in the amounts shown in Table 1 below.

TABLE 1

| | | | | | Transition metal compound/ | |
| | Alpha-olefin (mL) | Styrene (mL) | Organic zinc compound (µmol) | Methyl-cyclohexane (g) | Cocatalyst solution (µmol) | Me$_3$SiCH$_2$Li/PMDETA |
|---|---|---|---|---|---|---|
| Example 1 | 1-hexene 15 | 8.5 | 240 | 100 | 5 | 420 |
| Example 2 | 1-hexene 15 | 8.5 | 300 | 100 | 5 | 420 |
| Example 3 | 1-hexene 15 | 8.5 | 179 | 100 | 5 | 420 |
| Example 4 | 1-hexene 30 | 6.5 | 357 | 100 | 5 | 420 |
| Example 5 | 1-hexene 25 | 6.5 | 357 | 100 | 5 | 420 |
| Example 6 | 1-hexene 30 | 8.5 | 357 | 100 | 5 | 420 |
| Example 7 | 1-hexene 30 | 10 | 357 | 100 | 5 | 420 |
| Example 8 | 1-hexene 50 | 13 | 714 | 200 | 5 | 815 |
| Example 9 | 1-hexene 60 | 13 | 714 | 200 | 5 | 815 |
| Comparative Example 5 | Propylene 30 | 7.8 | 150 | 100 | 4 | 150 |
| Comparative Example 6 | Propylene 35 | 7.8 | 150 | 100 | 4 | 150 |
| Comparative Example 7 | 1-hexene 10 | 7.8 | 150 | 100 | 4 | 150 |
| Comparative Example 8 | 1-hexene 15 | 7.8 | 150 | 100 | 4 | 150 | ethyldiethylenetriamine (PMDETA) were mixed at a ratio of 1:1 (420 µmol) in methylcyclohexane, and the mixture was injected to the reactor and then stirred for 30 minutes. The stirring temperature was maintained at 90° C. to 100° C. 8.5 mL of styrene was injected to the high-pressure reactor and then, while maintaining the temperature between 90° C. and 100° C., was reacted over 5 hours to convert all the styrene monomers. After the complete conversion of the styrene, acetic acid and ethanol were continuously injected. A polymer composition obtained therefrom was dried overnight in a vacuum oven of 80° C.

[Formula 17]

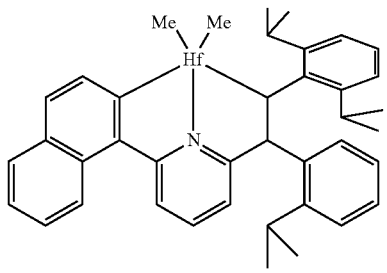

Comparative Examples 1 to 4

As Comparative Examples 1 to 4, Product #G1650, G1651, G1652, and G1654 of Kraton Company, which are commercially available SEBS, were used, respectively.

Comparative Example 5

30 mL of 1-propylene and 150 µmol of an organic zinc compound {(CH$_2$=CHC$_6$H$_4$CH$_2$CH$_2$)$_2$Zn} dissolved in 100 g of methylcyclohexane was introduced into a high-pressure reactor, and then the temperature of the reactor was raised to 80° C.

A solution (4 µmol) containing 1:1 ratio of a transition metal compound represented by Formula 17 and [(C$_{18}$H$_{37}$) N (Me) H$^+$[B (C$_6$F$_5$)$_4$]$^-$ which is a cocatalyst was injected into the high-pressure reactor, and then 30 g of propylene was immediately injected thereto, followed by ethylene to bring the pressure to 20 bar. The pressure was maintained at 20 bar.

A polymerization process was performed for 45 minutes at a temperature of 95° C. to 110° C., and then unreacted gas was discharged. Me$_3$SiCH$_2$Li and N,N,N",N",N"-pentamethyldiethylenetriamine (PMDETA) were mixed at a ratio of 1:1 (150 µmol) in methylcyclohexane, and the mixture was injected to the reactor and then stirred for 30 minutes. The stirring temperature was maintained at 90° C. to 110° C. 7.8 g of styrene was injected to the high-pressure reactor and then, while maintaining the temperature between 90° C. and 110° C., was reacted over 5 hours to convert all the styrene monomers. After the complete conversion of the styrene, acetic acid and ethanol were continuously injected. A polymer composition obtained therefrom was dried overnight in a vacuum oven of 80° C.

Comparative Example 6

A polymer composition was produced in the same manner as in Comparative Example 5 except that 35 mL of propylene was injected, followed by ethylene to bring the pressure to 20 bar and the pressure was maintained at 20 bar.

Comparative Example 7

10 mL of 1-hexene and 150 μmol of an organic zinc compound {$(CH_2=CHC_6H_4CH_2CH_2)_2Zn$} dissolved in 100 g of methylcyclohexane was introduced into a high-pressure reactor, and then the temperature of the reactor was raised to 80° C.

A solution (4 μmol) containing 1:1 ratio of a transition metal compound represented by Formula 17 and [$(C_{18}H_{37})$N (Me) $H^+$[B $(C_6F_5)_4$]$^-$ which is a cocatalyst was injected into the high-pressure reactor, and then 30 g of propylene was immediately injected thereto, followed by ethylene to bring the pressure to 20 bar. The pressure was maintained at 20 bar.

A polymerization process was performed at a temperature of 95° C. to 110° C. for 45 minutes, and then unreacted gas was discharged. $Me_3SiCH_2Li$ and N,N,N'',N'',N''-pentamethyldiethylenetriamine (PMDETA) were mixed at a ratio of 1:1 (150 μmol) in methylcyclohexane, and the mixture was injected to the reactor and then stirred for 30 minutes. The stirring temperature was maintained at 90° C. to 110° C. 7.8 g of styrene was injected to the high-pressure reactor and then, while maintaining the temperature between 90° C. and 110° C., was reacted over 5 hours to convert all the styrene monomers. After the complete conversion of the styrene, acetic acid and ethanol were continuously injected. A polymer composition obtained therefrom was dried overnight in a vacuum oven of 80° C.

Comparative Example 8

A polymer composition was produced in the same manner as in Comparative Example 7 except that 15 mL of 1-hexene was injected, followed by ethylene to bring the pressure to 20 bar and the pressure was maintained at 20 bar.

Experimental Examples

The physical properties of the block copolymer composition of each of Examples 1 to 9 and Comparative Examples 1 to 8 were measured according to the following methods, and the results are shown in Table 2 below.

1) Content of 1-Hexene, Branch, and Styrene

The measurement was performed through nuclear magnetic resonance (NMR). Using Bruker 600 MHz AVANCE III HD NMR device, 1H NMR was measured under the condition of ns=16, d1=3s, solvent=TCE-d2, and 373K, and then the TCE-d2 solvent peak was calibrated to 6.0 ppm. $CH_3$ of 1-propylene was confirmed at 1 ppm and a $CH_3$-related peak (triplet) of a butyl branch by 1-hexene was confirmed near 0.96 ppm to calculate the contents. In addition, the content of styrene was calculated using an aromatic peak near 6.5 to 7.5 ppm.

2) Weight Average Molecular Weight (Mw, g/Mol) and Polydispersity Index (PDI)

The weight average molecular weight (Mw, g/mol) and the number average molecular weight (Mn, g/mol) were measured by gel permeation chromatography (GPC), respectively, and the weight average molecular weight was divided by the number average molecular weight to calculate the polydispersity index (PDI).

Column: PL Olexis
Solvent: TCB (Trichlorobenzene)
Flow rate: 1.0 ml/min
Sample concentration: 1.0 mg/ml
Injection amount: 200 μl
Column temperature: 160° C.
Detector: Agilent High Temperature RI detector
Use polystyrene standard
Calculate molecular weight by Universal calibration using the Mark-Houwink equation ($K=40.8 \times 10^{-5}$, $\alpha=0.7057$)

3) Measurement of Tensile Strength, 300% Modulus, and Elongation

Using the polymer composition of each of Examples 1 to 9 and Comparative Examples 1 to 8, a molded product was prepared into a dumbbell shaped specimens according to ASTM D-412. According to ASTM D638, a cross head was pulled at a cross head speed of 500 mm/min using a universal testing machine (UTM) device (Model name: 4466, Instron), and then the point at which each specimen was cut was measured. The tensile strength was calculated by Equation 1 below. Also, the elongation (%) was calculated by Equation 2 below, and the 300% modulus (stress at 300%) was obtained by measuring the tensile strength when a specimen was stretched to three times the initial length.

$$\text{Tensile strength}(\text{kgf/mm}^2) = \frac{\text{Load value (kgf)}}{\text{Thickness (mm)} \times \text{Width (mm)}} \quad [\text{Equation 1}]$$

$$\text{Elongation} = \frac{\text{Length after elongation}}{\text{Initial length}} \times 100 \quad [\text{Equation 2}]$$

4) Content of Residual Double Bond

The measurement was performed through nuclear magnetic resonance (NMR). Using Bruker 600 MHz AVANCE III HD NMR device, 1H NMR was measured under the condition of ns=16, d1=3s, solvent=TCE-d2, and 373K, and then the TCE-d2 solvent peak was calibrated to 6.0 ppm. $CH_2$ of a double bond was confirmed at 5-5.5 ppm to calculate the content.

5) Content of Diblock Copolymer

A peak deconvolution was carried out between a GPC curve obtained using gel permeation chromatography (GPC) and two Gaussian curves.

As a program for peak deconvolution, Origin was used, and in the analysis, Multiple Peak Fit was used. Specifically, a measured molecular weight was assumed to be the molecular weight of the triblock copolymer and 75% of the measured molecular weight was assumed to be the molecular weight of the diblock copolymer, and two peaks of Gaussian curves were fitted. A weight percentage was calculated on the basis of a derived area percentage and the measured molecular weight.

TABLE 2

|  | Composition | | | Molecular weight | | Physical properties | | | Residual double bond (wt %) | Content of diblock copolymer (wt %) |
|  | Ethylene (wt %) | Branch (wt %) | Styrene (wt %) | Mw (g/mol) | PDI | Elongation (%) | Tensile strength (MPa) | 300% modulus (MPa) | | |
|---|---|---|---|---|---|---|---|---|---|---|
| Example 1 | 51.5 | 20.1 | 28.4 | 102,700 | 1.7 | 1,201 | 26.4 | 6.7 | 0 | 14.8 |
| Example 2 | 55.1 | 22.0 | 22.9 | 82,000 | 1.6 | 1,301 | 22.4 | 5.5 | 0 | 13.2 |
| Example 3 | 49.0 | 21.3 | 29.7 | 98,500 | 1.5 | 1,253 | 25.4 | 5.9 | 0 | 11.8 |
| Example 4 | 47.7 | 25.8 | 26.5 | 76,700 | 1.6 | 1,603 | 23.4 | 3.3 | 0 | 13.8 |
| Example 5 | 50.8 | 20.7 | 28.5 | 77,900 | 1.6 | 1,356 | 30.6 | 6.2 | 0 | 11.5 |
| Example 6 | 48.3 | 27.7 | 24 | 78,400 | 1.7 | 1,845 | 24.1 | 3.5 | 0 | 9.6 |
| Example 7 | 49.1 | 20.9 | 30.1 | 101,200 | 1.7 | 1,139 | 29.3 | 6.1 | 0 | 11.8 |
| Example 8 | 46.9 | 28.7 | 24.4 | 79,700 | 1.7 | 1,779 | 23.0 | 3.3 | 0 | 13.8 |
| Example 9 | 48.4 | 31.6 | 22.0 | 76,100 | 1.9 | 2,208 | 21.2 | 2.4 | 0 | 10.2 |
| Comparative Example 1 | 44.3 | 26.2 | 29.5 | 54,600 | 1.1 | 1,305 | 29.9 | 2.9 | 0.99 | 0 |
| Comparative Example 2 | 43.4 | 24.8 | 31.8 | 139,300 | 1.1 | — | — | — | 0.42 | 0 |
| Comparative Example 3 | 44.6 | 26.6 | 28.8 | 44,100 | 1.1 | 1,325 | 30.7 | 3.3 | 0.24 | 0 |
| Comparative Example 4 | 43.3 | 25.5 | 31.2 | 95,600 | 1.1 | 1,584 | 30.6 | 2.2 | 0.42 | 0 |
| Comparative Example 5 | 39.3 | 18.6 | 42.1 | 111,000 | 1.7 | 850 | 9.5 | 4.5 | 0 | 21.7 |
| Comparative Example 6 | 45.5 | 22.5 | 32.0 | 109,000 | 1.7 | 1390 | 8.2 | 2.5 | 0 | 20.2 |
| Comparative Example 7 | 45.2 | 21.3 | 33.5 | 69,000 | 1.6 | 802 | 16.5 | 7.7 | 0 | 19.8 |
| Comparative Example 8 | 47.7 | 16.4 | 35.9 | 68,000 | 1.5 | 1,294 | 21.4 | 5.9 | 0 | 20.9 |

Referring to Table 1, the polymer composition of each of Examples 1 to 9 has a polydispersity index (PDI) value relatively higher than that of SEBS of each of Comparative Examples 1 to 4, and thus, is expected to exhibit excellent processability. In addition, the polymer of each of Examples 1 to 9 has a high polydispersity index (PDI) value as well as excellent values of elongation, 300% modulus which represents elasticity, and tensile strength. From the results, it can be confirmed that the polymers of Examples 1 to 9 have excellent physical properties that are different from the physical properties of the polymers of Comparative Examples 1 to 8, which are not good in one or more physical properties.

The invention claimed is:

1. A method for producing a polyolefin-polystyrene block copolymer composition, comprising:
   reacting an organic zinc compound with one or more kinds of olefin-based monomers in the presence of a transition metal catalyst to form an intermediate having an olefin-based polymer block; and
   reacting the intermediate with a styrene-based monomer in the presence of an alkyllithium compound to form a product including a styrene-based polymer block,
   wherein the number of moles of the alkyllithium compound used to form the styrene-based polymer block is larger than the number of moles of the organic zinc compound used to form the intermediate, and
   wherein the polyolefin-polystyrene block copolymer composition comprises a diblock copolymer and a triblock copolymer, each of the diblock and triblock copolymers comprising a polyolefin-based block and a polystyrene-based block, wherein the content of the diblock copolymer is 19 wt % or less, based on the total weight of the polyolefin-polystyrene block copolymer composition.

2. The method of claim 1, wherein the olefin-based monomer forms a first block including a repeating unit represented by Formula 1:

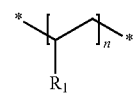

[Formula 1]

wherein
$R_1$ is hydrogen, alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl, and
n is an integer of 1 to 10,000.

3. The method of claim 2, wherein the first block comprises a repeating unit A represented by Formula 2:

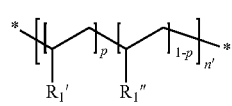

[Formula 2]

wherein
$R_1'$ and $R_1''$ are each independently hydrogen, alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl, wherein $R_1'$ and $R_1''$ are different from each other,
$0<p<1$, and
n' is an integer of 10 to 10,000.

4. The method of claim 1, wherein the one or more kinds of olefin-based monomer comprises ethylene and one or more kinds of alpha-olefin-based monomer, and the alpha-olefin-based monomer is an aliphatic olefin having 2 to 20 carbon atoms.

5. The method of claim 1, wherein the organic zinc compound is a compound A represented by Formula 3:

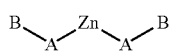

[Formula 3]

wherein

A is alkylene having 1 to 20 carbon atoms, arylene having 6 to 20 carbon atoms, or arylene having 6 to 20 carbon atoms substituted with halogen, alkyl having 1 to 12 carbon atoms, cycloalkyl having 3 to 12 carbon atoms, alkoxy having 1 to 8 carbon atoms or aryl having 6 to 12 carbon atoms, and B is arylene having 6 to 12 carbon atoms substituted with alkenyl having 2 to 12 carbon atoms.

6. The method of claim 5, wherein A is alkylene having 1 to 12 carbon atoms, arylene having 6 to 12 carbon atoms, or arylene having 6 to 12 carbon atoms substituted with halogen, alkyl having 1 to 12 carbon atoms, cycloalkyl having 3 to 12 carbon atoms, alkoxy having 1 to 8 carbon atoms or aryl having 6 to 12 carbon atoms, and B is arylene having 6 to 12 carbon atoms substituted with alkenyl having 2 to 8 carbon atoms.

7. The method of claim 1, wherein the olefin-based monomer is inserted between Zn and A of the organic zinc compound and polymerized to form the olefin-based polymer block.

8. The method of claim 7, wherein the styrene-based monomer is inserted between Zn of the intermediate and the olefin-based polymer block and polymerized to form a styrene-based polymer block.

9. The method of claim 1, wherein the intermediate is represented by Formula 4:

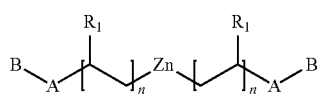

[Formula 4]

wherein $R_1$ is hydrogen, alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl, A is alkylene having 1 to 20 carbon atoms, arylene having 6 to 20 carbon atoms, or arylene having 6 to 20 carbon atoms substituted with halogen, alkyl having 1 to 12 carbon atoms, cycloalkyl having 3 to 12 carbon atoms, alkoxy having 1 to 8 carbon atoms or aryl having 6 to 12 carbon atoms, B is arylene having 6 to 12 carbon atoms substituted with alkenyl having 2 to 12 carbon atoms, and n is an integer of 10 to 10,000.

10. The method of claim 1, wherein the styrene-based monomer forms a second block including a repeating unit represented by Formula 6:

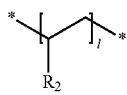

[Formula 6]

wherein $R_2$ is aryl having 6 to 20 carbon atoms, or aryl having 6 to 20 carbon atoms substituted with halogen, alkyl having 1 to 12 carbon atoms, cycloalkyl having 3 to 12 carbon atoms, alkoxy having 1 to 8 carbon atoms or aryl having 6 to 12 carbon atoms, and l is an integer of 10 to 1,000.

11. The method of claim 1, wherein the styrene-based monomer forms a second block including a repeating unit represented by Formula 6 and a third block represented by Formula 9, respectively:

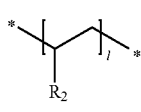

[Formula 6]

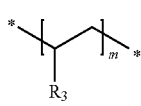

[Formula 9]

wherein $R_2$ and $R_3$ are each independently aryl having 6 to 20 carbon atoms, or aryl having 6 to 20 carbon atoms substituted with halogen, alkyl having 1 to 12 carbon atoms, cycloalkyl having 3 to 12 carbon atoms, alkoxy having 1 to 8 carbon atoms or aryl having 6 to 12 carbon atoms, and l and m are each independently an integer of 10 to 1,000.

12. The method of claim 1, wherein the product is represented by Formula 10:

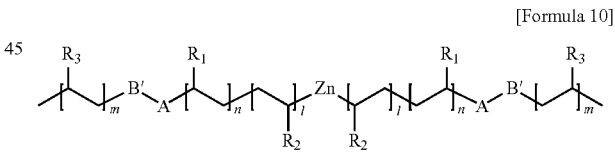

[Formula 10]

wherein $R_1$ is hydrogen, unsubstituted or substituted alkyl having 1 to 20 carbon atoms wherein the substituent is silyl, or unsubstituted or substituted arylalkyl having 7 to 20 carbon atoms wherein the substituent is silyl, $R_2$ and $R_3$ are each independently unsubstituted or substituted aryl having 6 to 20 carbon atoms wherein the substituent is halogen, alkyl having 1 to 12 carbon atoms, cycloalkyl having 3 to 12 carbon atoms, alkoxy having 1 to 8 carbon atoms or aryl having 6 to 12 carbon atoms, l and m are each independently an integer of 10 to 1,000, and n is an integer of 10 to 10,000.

13. The method of claim 1, wherein a molar ratio of the organic zinc compound to the alkyllithium compound is 1:1.05 to 1:4.

14. The method of claim 1, which further comprises reacting the product with water, oxygen, or an organic acid to convert the product into a block copolymer.

* * * * *